(12) United States Patent
Lininger et al.

(10) Patent No.: US 10,206,333 B2
(45) Date of Patent: Feb. 19, 2019

(54) COMPRESSED BALE PACKAGING APPARATUS WITH BAG APPLICATOR ASSIST DEVICE AND BAG FOR SAME

(71) Applicant: Signode Industrial Group LLC, Glenview, IL (US)

(72) Inventors: Joseph E. Lininger, Union Grove, WI (US); Andrew J. Nyckowski, Beach Park, IL (US); Stanislaw Witczak, Lincolnshire, IL (US)

(73) Assignee: SIGNODE INDUSTRIAL GROUP LLC, Glenview, IL (US)

( * ) Notice: Subject to any disclaimer, the term of this patent is extended or adjusted under 35 U.S.C. 154(b) by 411 days.

(21) Appl. No.: 15/088,300

(22) Filed: Apr. 1, 2016

(65) Prior Publication Data

US 2016/0330910 A1 Nov. 17, 2016

Related U.S. Application Data

(60) Provisional application No. 62/161,554, filed on May 14, 2015.

(51) Int. Cl.
*A01F 25/14* (2006.01)
*B65B 43/46* (2006.01)
(Continued)

(52) U.S. Cl.
CPC ............ *A01F 25/14* (2013.01); *B65B 27/125* (2013.01); *B65B 39/08* (2013.01); *B65B 43/465* (2013.01)

(58) Field of Classification Search
CPC ..................................................... B65B 27/12
(Continued)

(56) References Cited

U.S. PATENT DOCUMENTS 1,846,949 A 2/1932 Clark
2,219,970 A 10/1940 Wallace
(Continued)

FOREIGN PATENT DOCUMENTS

AU 4851768 A 7/1971
AU 310432 10/2006
(Continued)

OTHER PUBLICATIONS

International Search Report issued by ISA/EPO in connection with PCT/US2016/031077 dated Sep. 13, 2016.
(Continued)

*Primary Examiner* — Lori Baker
(74) *Attorney, Agent, or Firm* — Levenfeld Pearlstein, LLC

(57) ABSTRACT

A bag applicator assist device for a baling system having a discharge mandrel, includes a frame movable longitudinally along the mandrel from a loading position to a bagging position and at least one gripper mounted to the frame. The gripper is movable between a closed position to secure the bag therein and an open position to release the bag from the gripper. A bag is positioned in the gripper at the loading position, the frame is moved longitudinally along the mandrel from the loading position to the bagging position and the bag is released from the gripper when the frame is in the bagging position. A bag configured for use with the applicator assist device includes a polymeric tubular member having a sealed end and an open end. The open end defines four corners. The bag has a gripper receiving region at about each corner.

14 Claims, 17 Drawing Sheets

(51) Int. Cl.
  *B65B 27/12* (2006.01)
  *B65B 39/08* (2006.01)
(58) Field of Classification Search
  USPC .......................................................... 53/570
  See application file for complete search history.

(56) References Cited

U.S. PATENT DOCUMENTS

| | | |
|---|---|---|
| 2,783,598 A | 3/1957 | Wolven |
| 3,044,231 A | 7/1962 | Blais et al. |
| 3,172,351 A | 3/1965 | Sinclair et al. |
| 3,968,619 A | 7/1976 | Fishburne |
| 4,007,575 A | 2/1977 | Hartman |
| 4,162,603 A | 7/1979 | Stromberg |
| 4,287,823 A | 9/1981 | Thompson |
| 4,352,263 A | 10/1982 | Andrews, Jr. |
| 4,495,751 A | 1/1985 | Galbiati |
| 4,616,472 A | 10/1986 | Owensby et al. |
| 4,757,667 A | 7/1988 | Elsner |
| 4,918,905 A | 4/1990 | Hoekstra |
| 4,995,219 A | 2/1991 | Hicks |
| 5,024,042 A | 6/1991 | Meyer |
| 5,054,274 A | 10/1991 | Tanaka |
| 5,058,364 A | 10/1991 | Seiden et al. |
| 5,088,271 A | 2/1992 | Westaway |
| 5,117,614 A | 6/1992 | Johnsen |
| 5,181,365 A | 1/1993 | Garvey et al. |
| 5,327,704 A | 7/1994 | Hoekzema et al. |
| 5,337,539 A | 8/1994 | Barton |
| 5,540,032 A | 7/1996 | Sosnik et al. |
| 5,551,212 A | 9/1996 | Odenthal |
| 5,661,948 A | 9/1997 | Odenthal |
| 5,694,742 A | 12/1997 | Elliott |
| 5,694,746 A | 12/1997 | Elliott et al. |
| 5,722,217 A | 3/1998 | Cloud |
| 5,743,374 A | 4/1998 | Monsees |
| 5,890,426 A | 4/1999 | Gumkowski |
| 6,093,138 A | 7/2000 | Sorenson et al. |
| 6,170,237 B1 | 1/2001 | Wipf |
| 6,253,817 B1 | 7/2001 | Edwards et al. |
| 6,564,527 B1 | 5/2003 | Focke et al. |
| 6,823,650 B2 | 11/2004 | Recchia, Jr. |
| 6,865,862 B2 | 3/2005 | Daoust |
| 7,013,625 B2 | 3/2006 | Curles |
| 7,386,968 B2 | 6/2008 | Sperry et al. |
| 7,389,723 B1 | 6/2008 | Bullington |
| 7,421,944 B1 | 9/2008 | Flaum |
| 7,891,156 B2 | 2/2011 | Beer |
| 7,958,699 B2 | 6/2011 | Honegger |
| 7,987,651 B2 | 8/2011 | Beeland et al. |
| 8,096,097 B2 | 1/2012 | Haschke |
| 8,235,712 B1 | 8/2012 | Lewis |
| 8,556,066 B2 | 10/2013 | Honegger |
| 2002/0108355 A1 | 8/2002 | Vignoli |
| 2004/0216431 A1 | 11/2004 | Curles |
| 2005/0284107 A1 | 12/2005 | Concetti |
| 2005/0284775 A1 | 12/2005 | McLaughlin |
| 2008/0313998 A1 | 12/2008 | Ligon et al. |
| 2009/0241487 A1 | 10/2009 | Actis |
| 2010/0146908 A1 | 6/2010 | Honegger |
| 2010/0242746 A1 | 9/2010 | Taylor |
| 2011/0036055 A1 | 2/2011 | Shibagaki |
| 2011/0094396 A1 | 4/2011 | Borrelli et al. |
| 2013/0097965 A1 | 4/2013 | Honegger |
| 2013/0097966 A1 | 4/2013 | Honegger |
| 2013/0097976 A1 | 4/2013 | Honegger |
| 2013/0305662 A1 | 11/2013 | Nycowski |
| 2014/0041339 A1 | 2/2014 | Borrelli |
| 2014/0158560 A1 | 6/2014 | Nyckowski |
| 2014/0360138 A1 | 12/2014 | Honegger |
| 2014/0360139 A1 | 12/2014 | Honegger |
| 2015/0075118 A1 | 3/2015 | Pearson |

FOREIGN PATENT DOCUMENTS

| | | |
|---|---|---|
| CN | 1527778 A | 9/2004 |
| CN | 2764602 Y | 3/2006 |
| CN | 1290745 C | 12/2006 |
| DE | 3009016 A1 | 9/1981 |
| DE | 202011052218 U1 | 1/2013 |
| EP | 0198992 A1 | 10/1986 |
| EP | 0928555 A1 | 7/1999 |
| FR | 2145935 A5 | 2/1973 |
| WO | 9420366 A1 | 9/1994 |
| WO | 2006115973 A1 | 11/2006 |
| WO | 2007028558 A1 | 3/2007 |
| WO | 2008040090 A1 | 4/2008 |
| WO | 2009115314 A1 | 9/2009 |
| WO | 2012099754 A2 | 7/2012 |
| WO | 2013156854 A2 | 10/2013 |

OTHER PUBLICATIONS

International Preliminary Report on Patentability issued by ISA/EPO in connection with PCT/US2016/031077 dated Nov. 14, 2017.

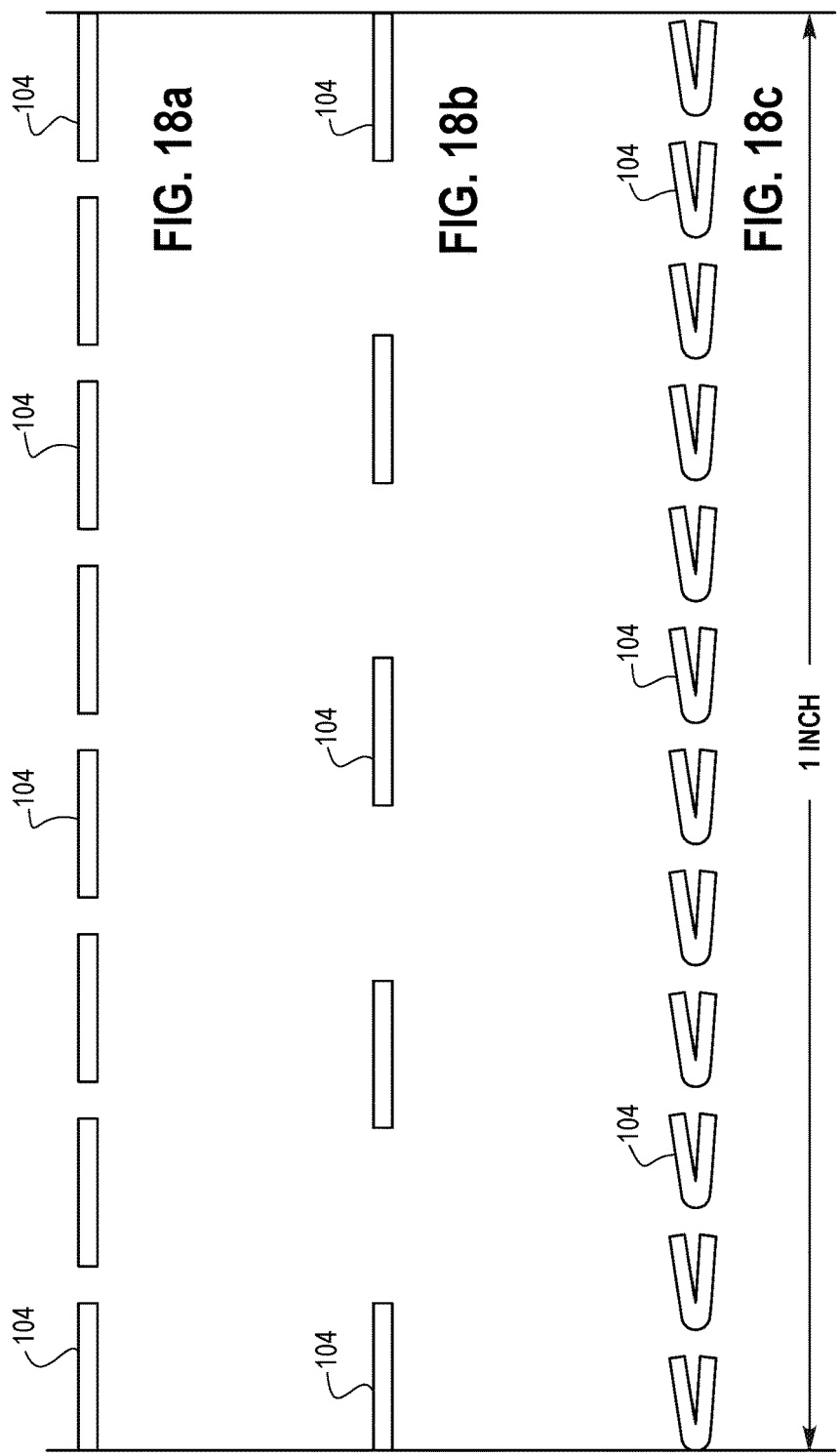

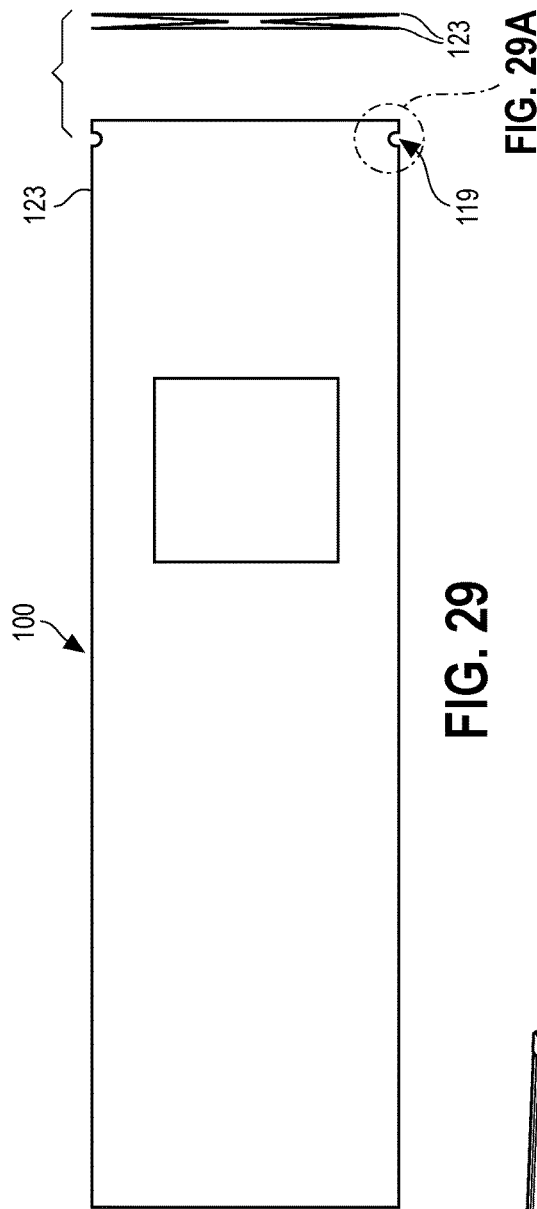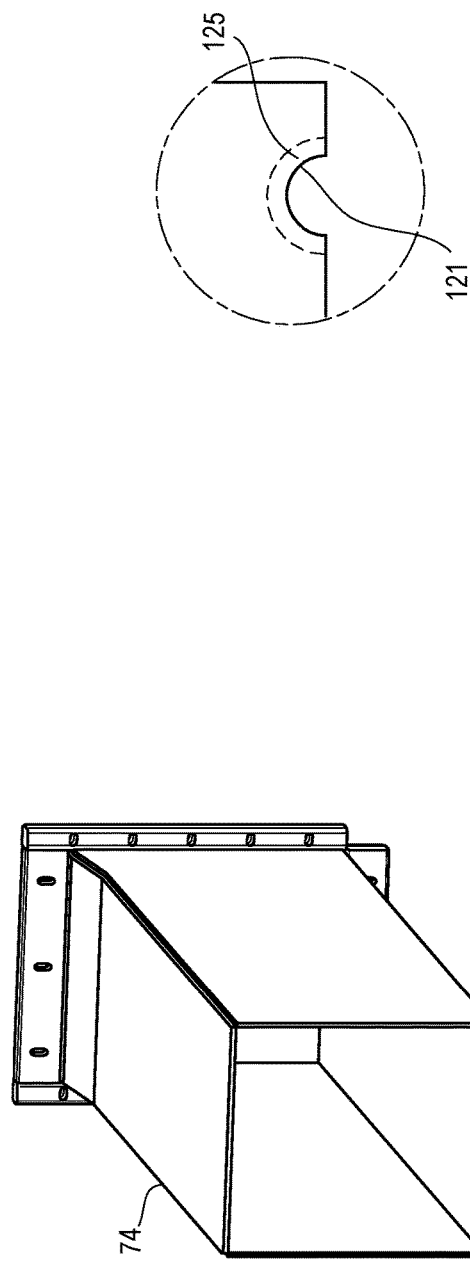

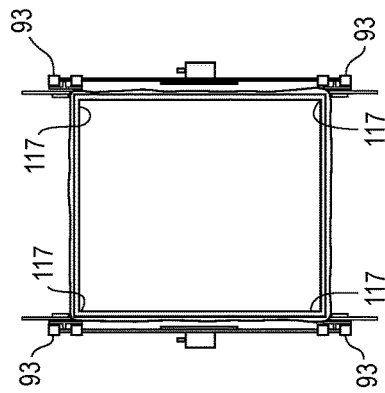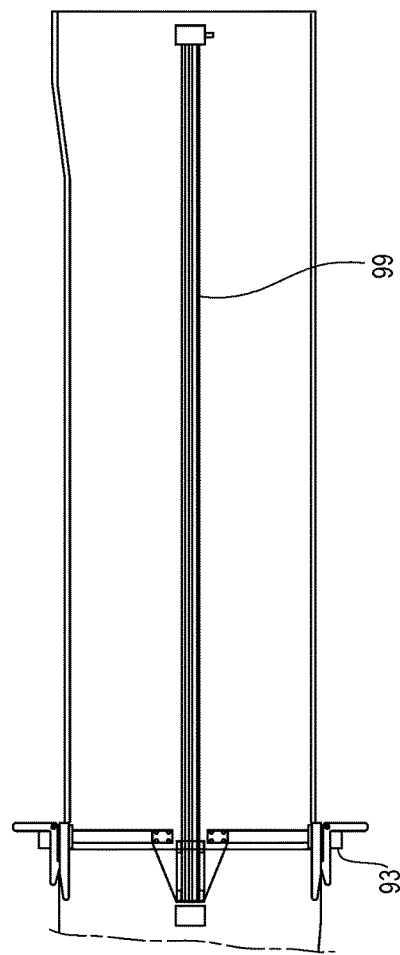

COMPRESSED BALE PACKAGING APPARATUS WITH BAG APPLICATOR ASSIST DEVICE AND BAG FOR SAME

CROSS-REFERENCE TO RELATED APPLICATION DATA

This application claims the benefit of and priority to Provisional U.S. Patent Application Ser. No. 62/161,554, filed May 14, 2015, the disclosure of which is incorporated herein in its entirety.

BACKGROUND

Large quantities of low density fibrous materials such as cotton and the like are often bundled or baled for handling and storage. In a typical process, cotton is cleaned to separate the cotton fibers from sticks and other debris, and the cotton fibers are separated from the seed in a gin. The cotton (referred to as lint) is transported to a press or baler where it is compressed into a high density bundle or bale. Following compaction, the bale is secured to facilitate handling. The bale can be secured by multiple straps or wires to maintain the bale configuration and stability. One industry standard is to band the bale with eight (8) wires or straps around the shorter periphery of the bale.

Typically, the bale is then sampled and classed into a standard cotton class to identify the quality of the cotton. The bale is then wrapped for protection, for example, in a wrap or bag, to protect the cotton from exposure to the environs, dirt, debris or factors that can affect the cotton quality. Wrapping or bag materials include polyethylene (PE), polyethylene terephthalate (PET) polypropylene (PP), cotton and the like. The wrapped bale can then be transported for subsequent processing.

While the wrapping or bagging can help to prevent damage to the bale, the wrapping or bagging material itself can be damaged. For example, at ginning facilities, cotton bales are often stored two layers high, which can put a significant amount of strain on the bales, particularly the bottom bale. Also, the cotton bales stored in certain facilities have to be rearranged or moved from time to time, such as while being loaded onto a truck for delivery. Moreover, the configuration of cotton bales being stored in a warehouse or other storage facility has to be changed from time to time in order to optimize warehouse space. During this stacking and moving, and loading and unloading of the bales described above, the bales are frequently being pushed on an abrasive surface (e.g., concrete or asphalt flooring of a warehouse or storage facility) causing straps to break and bags or wrapping material to rupture.

U.S. Publication No. 2014/0158560 to Nyckowski et al. discloses a method and apparatus for containing a bale of compressible material without the use of straps or wires. The Nyckowski et al. publication discloses a press that has a bale box (i.e., four sides fixed that define the walls of a box) and upper and lower compression plates that compress the material in the box. The upper and lower compression plates have ribs that, when pressed into the bale, form grooves in the sides of the bale that are engaged by the plates. After compression, the bale expands. Typically, the bale expands more in the same direction in which it is compressed.

The device of Nyckowski also includes a transfer device and a bagger. The transfer device moves the compressed bale from the press to the bagger. The bagger includes an entrance and a mandrel on a discharge end thereof. During the baling operation, a bag is manually positioned on the mandrel and the compressed bale is urged from the bagger, through the mandrel and into the bag. The bag is pulled from the mandrel as the bale is pushed into the bag.

Manually positioning the bag on the mandrel is both labor and time intensive. An operator is required to unfold or unroll a bag, open the bag and properly orient the bag to pull it onto the mandrel. The operator must then pull the bag up onto the mandrel until the open end of the bag is at about the flange that secures the mandrel to bagger and so that the closed or sealed end of the bag is at the open end of the mandrel. In the event that the operator is away from the baler or not at the bagger station, the process can be slowed or can stop until the operator can properly position the bag on the mandrel.

There is therefore a need for an improved system for positioning a bag on the discharge mandrel of a bagger that increases efficiency in the bagging operation and reduces operator interface requirements.

SUMMARY

Various embodiments of the present disclosure provide a system and or device for readily positioning a bag on a mandrel of a strapless baling machine used to contain a bale of compressible material without the use of straps or wires in a bag. The bale is compressed in a press and transferred to a bagger. The bale is then conveyed through a discharge mandrel at a downstream end of the bagger and into a bag that is positioned on the mandrel.

A bag applicator assist device facilitates positioning a bag on the discharge mandrel. In an embodiment, the assist device includes a frame that extends around the periphery of the mandrel. The frame is movable longitudinally along the mandrel from a loading position at which the bag is loaded onto the device and a bagging position at which the bag is positioned on the mandrel for receipt of the bale.

The assist device includes at least one gripper that is mounted to the frame and is movable between a closed position to secure a portion of the bag in the gripper and an open position to release the bag from the gripper. In an embodiment, four grippers are present at four corners of the frame. The bag is positioned in the grippers at the loading position, the frame is moved along the rails to position the bag at the bagging position and the bag is released from the grippers when the frame is at the bagging position.

In an embodiment, each gripper includes a stationary finger and a movable finger. The movable finger can be biased toward the stationary finger. The movable fingers can include a hook or detent that cooperates with the stationary finger to secure the bag between the fingers. The stationary fingers can include a channel or opening to receive the hook or detent. A release member can be present to facilitate opening the gripper. The release member can be, for example, a lever pivotally mounted on the movable finger.

The frame can be mounted to a rail for movement along the rail between the loading position and the bagging position. The applicator assist device can include a plurality of rails along which the frame moves from the loading position to the bagging position.

A bag is disclosed that is configured for containing a bale of compressible material. In an embodiment, the bag is a polymeric tubular member having a sealed end and an open end. The open end defines four corners. The tubular member has, at about each corner, a gripper receiving region. The gripper receiving regions are different from regions adjacent thereto. In an embodiment, the gripper receiving regions are through-wall openings. The through-wall openings may be reinforced in the area surrounding or adjacent to the openings.

The bag can be formed from woven strands of polymeric material, for example, woven strands of polyethylene terephthalate (PET). The bag can also include ventilation openings.

These and other features and advantages of the present method, system and device will be apparent from the following detailed description, in conjunction with the appended claims.

BRIEF DESCRIPTION OF THE DRAWINGS

FIGS. 18a-18c illustrate three different example bag weave densities;

FIG. 25 is a perspective illustration of a known bagging mandrel;

FIGS. 27A and 27B are front and side views of the mandrel with the bag applicator assist device mounted to the mandrel;

FIG. 28A-28C illustrate the operation of an example of a bag gripper, in which FIG. 28A illustrates the bag being inserted into the gripper; FIG. 28B illustrates the bag in the gripper as the bag assist frame is moved into the bagging position on the mandrel, and FIG. 28C illustrates the bag gripper as the bag is fully in position on the mandrel and the gripper is in the release position;

FIG. 29 is a side view of a bag having a gripper receiving region formed therein; and FIG. 29A is an enlarged view of the area indicated in the circle FIG. 29.

DETAILED DESCRIPTION

Various embodiments of the present disclosure provide a method, system, and/or device for containing a bale of compressible material without the use of straps or wires.

Figure 1:
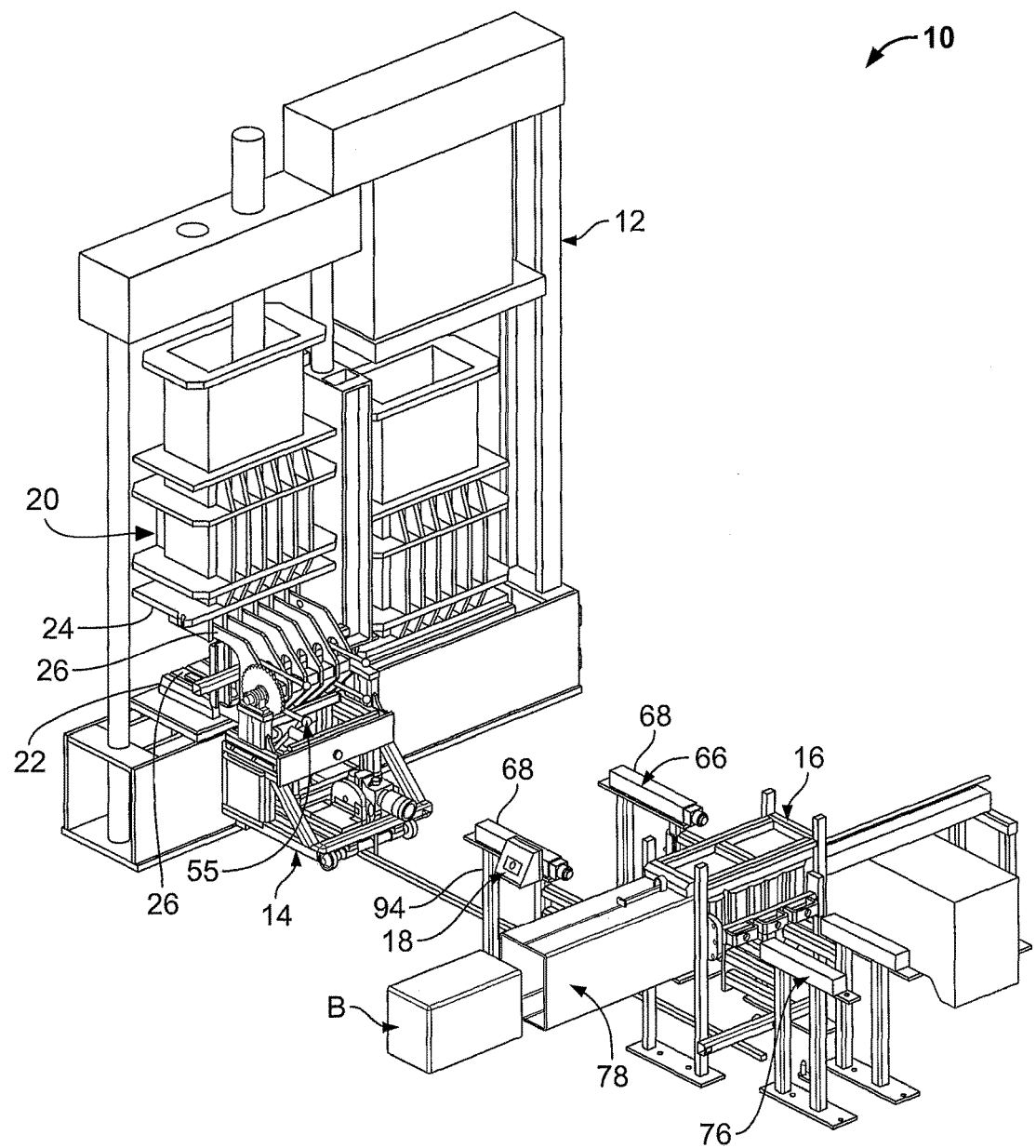
FIG. 1 is a perspective illustration of a compressible material press and a baler including an example embodiment of a system of the present disclosure.
Figure 2:
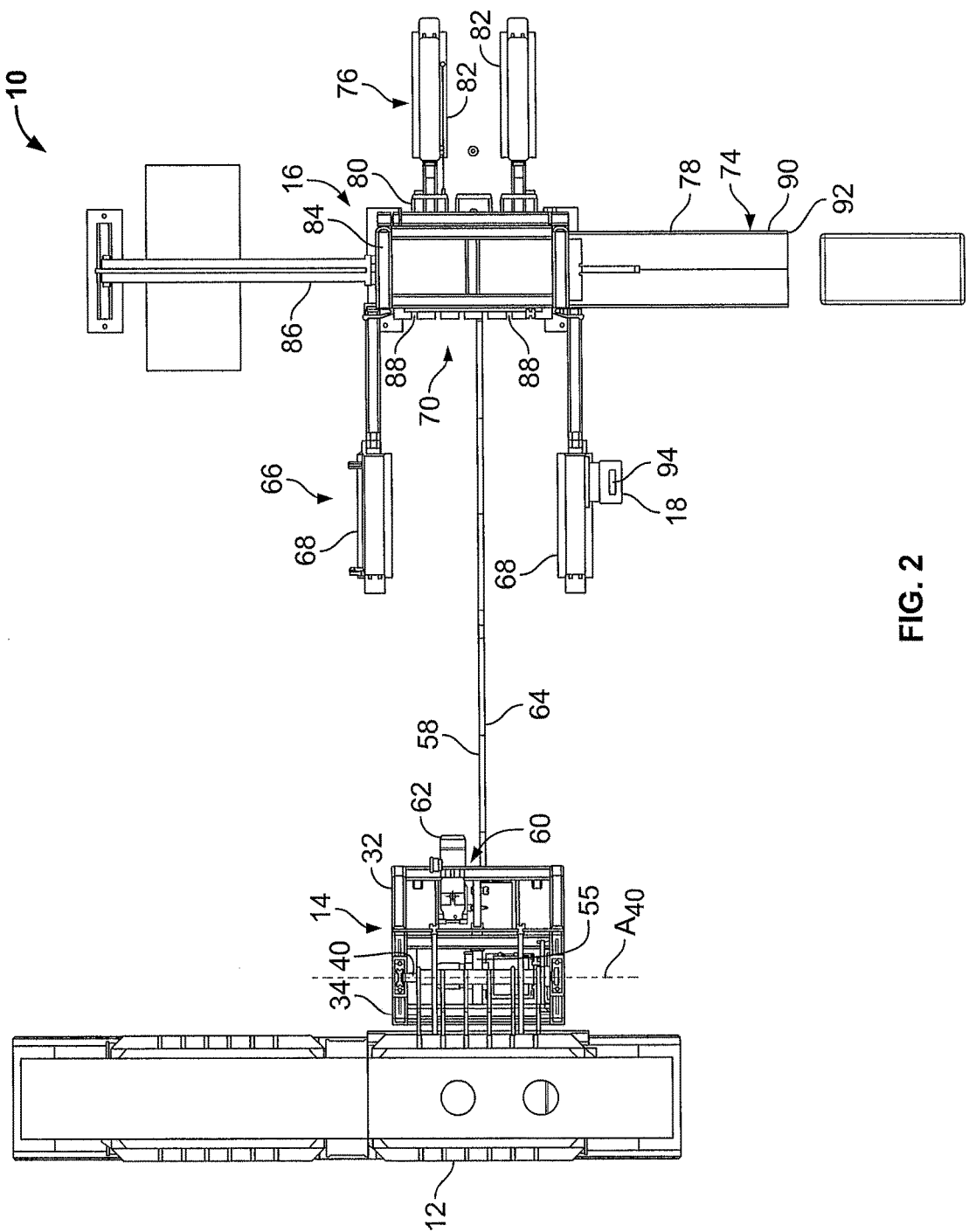
FIG. 2 is a top view of the baler and press of FIG. 1.
Figure 3:
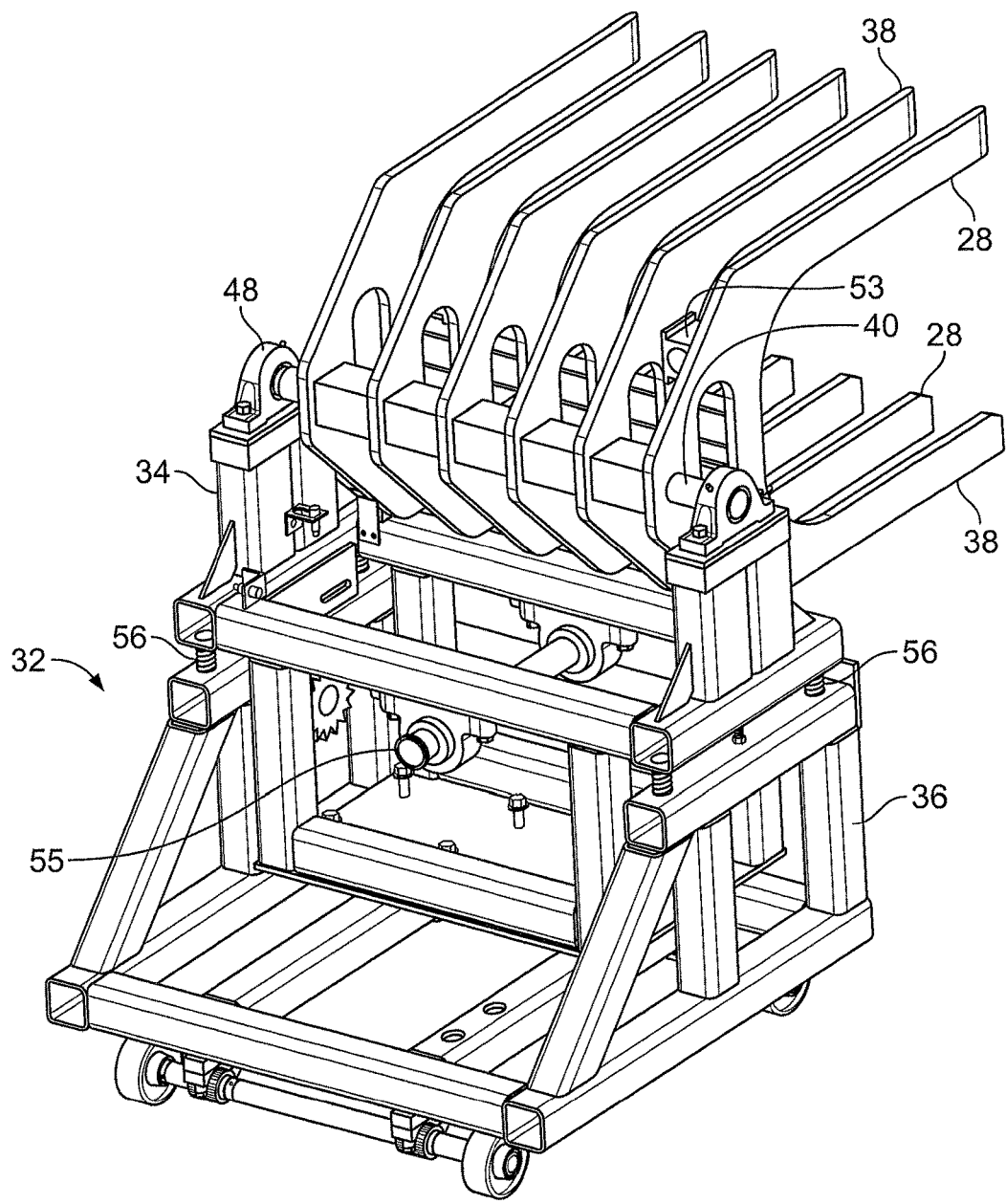
FIG. 3 is a perspective view of a conveyor load carriage and a mobile base of the illustrated example embodiment of the system of the present disclosure.
Figure 4:
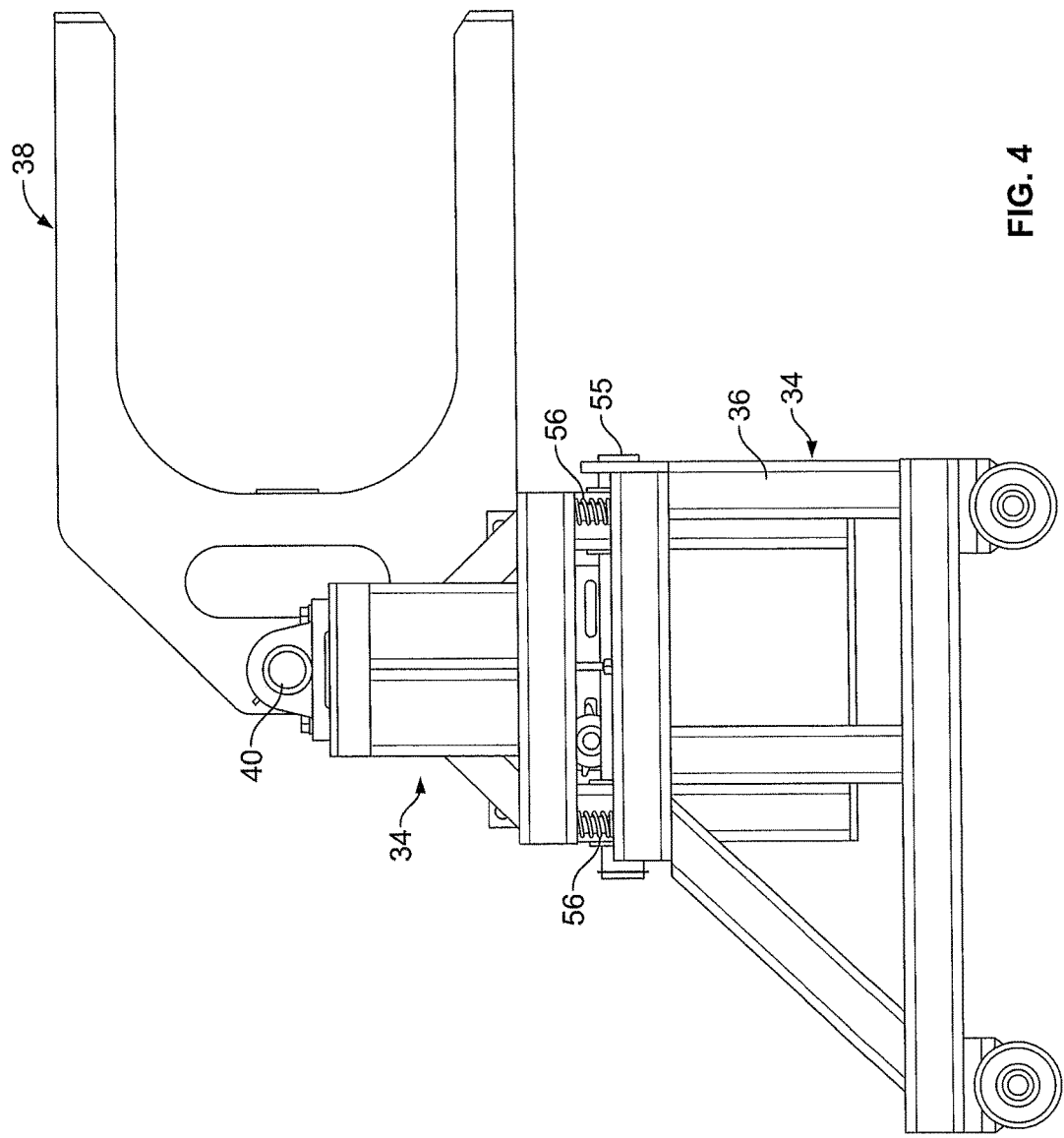
FIG. 4 is a front view of the conveyor load carriage and mobile base.
Figure 5:
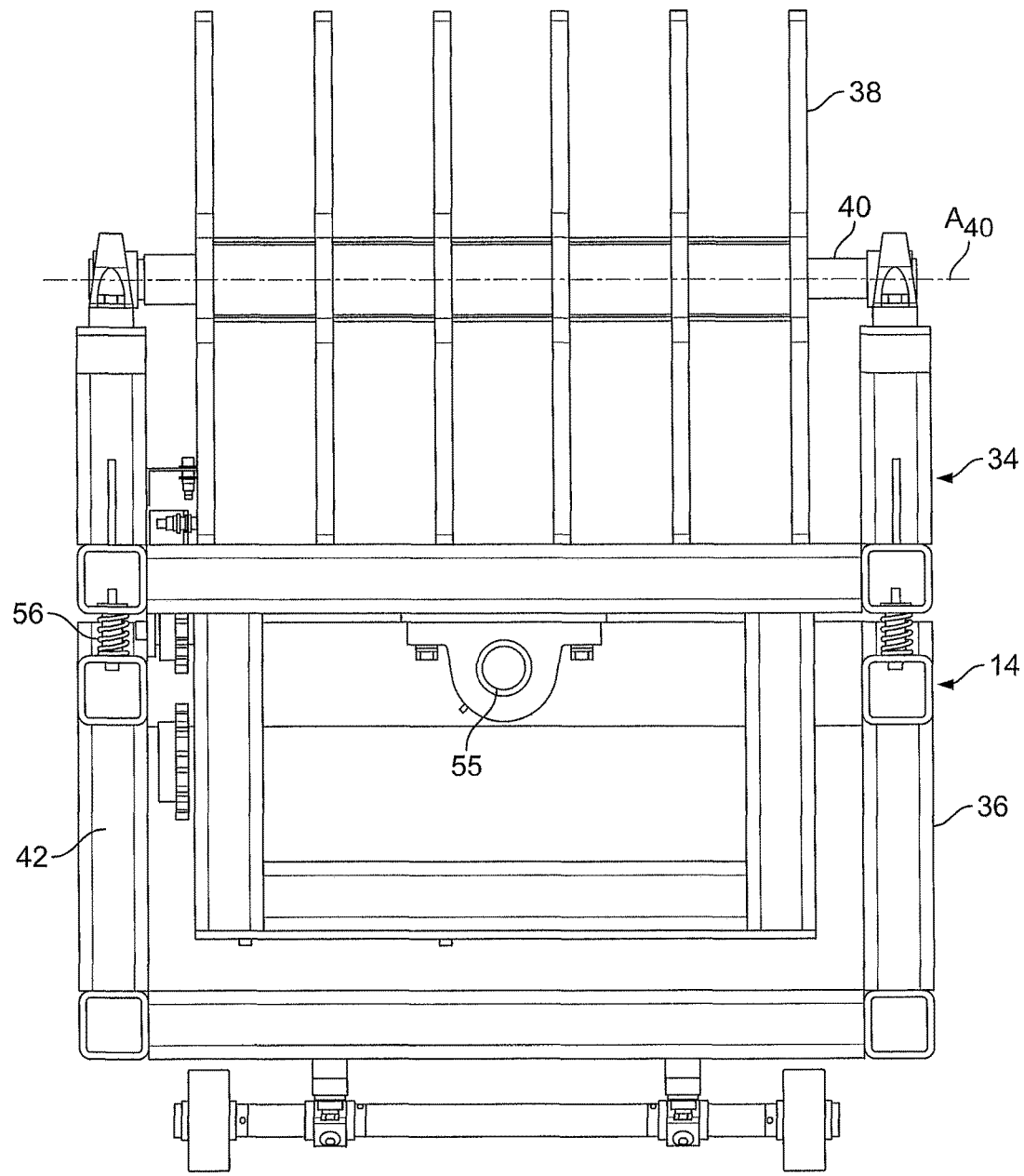
FIG. 5 is a side view of the conveyor load carriage and mobile base.
Figure 6:
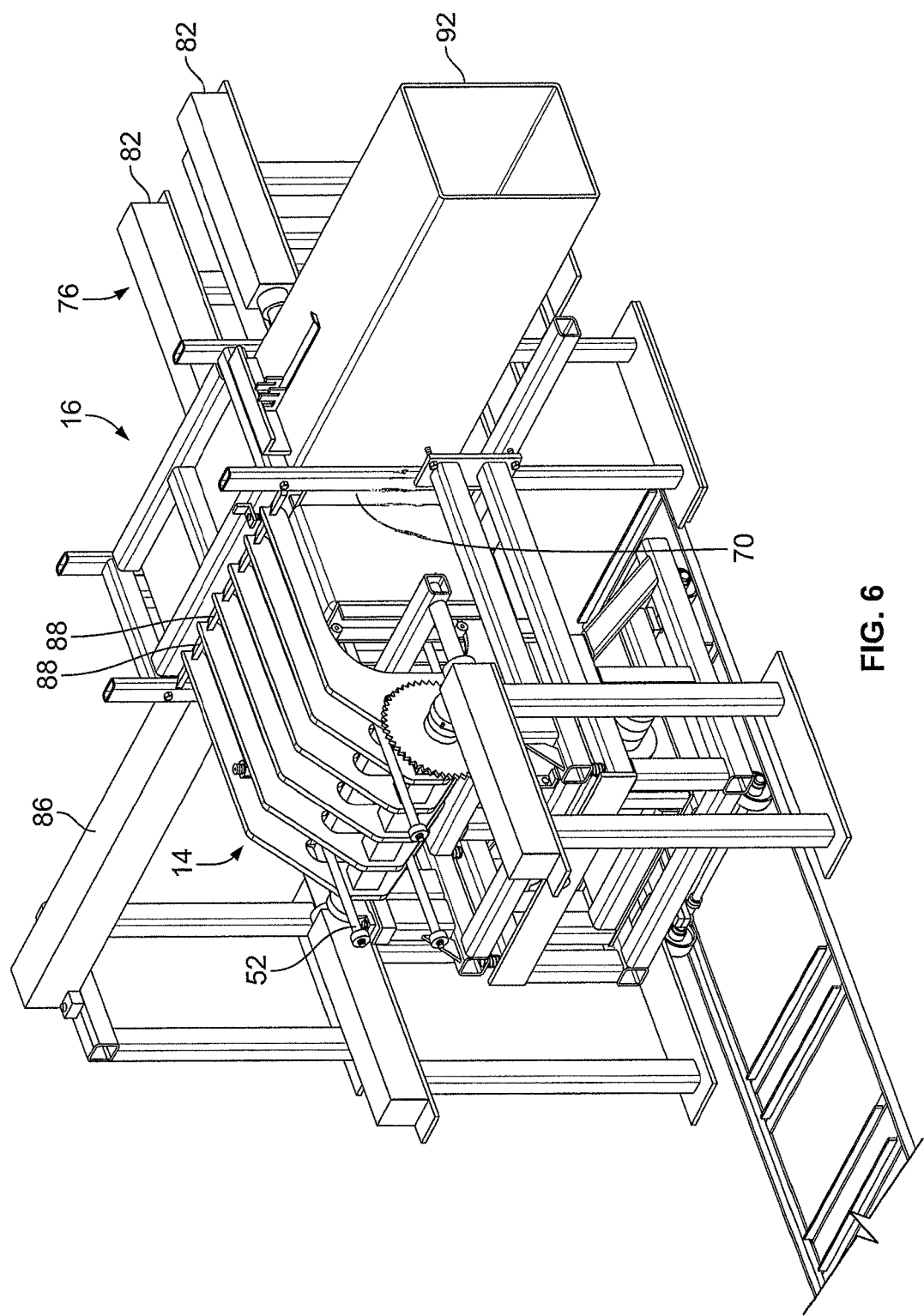
FIG. 6 is perspective view of the conveyor load carriage and mobile base in position to transfer a bale to a bagger.
Figure 8:
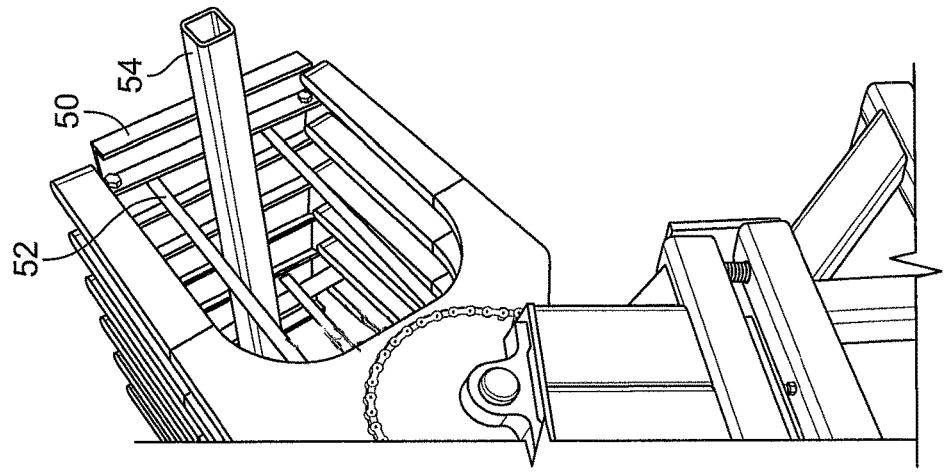
FIG. 8 illustrates the load carriage in a partially pivoted state with the transfer plate extended.
Figure 7:
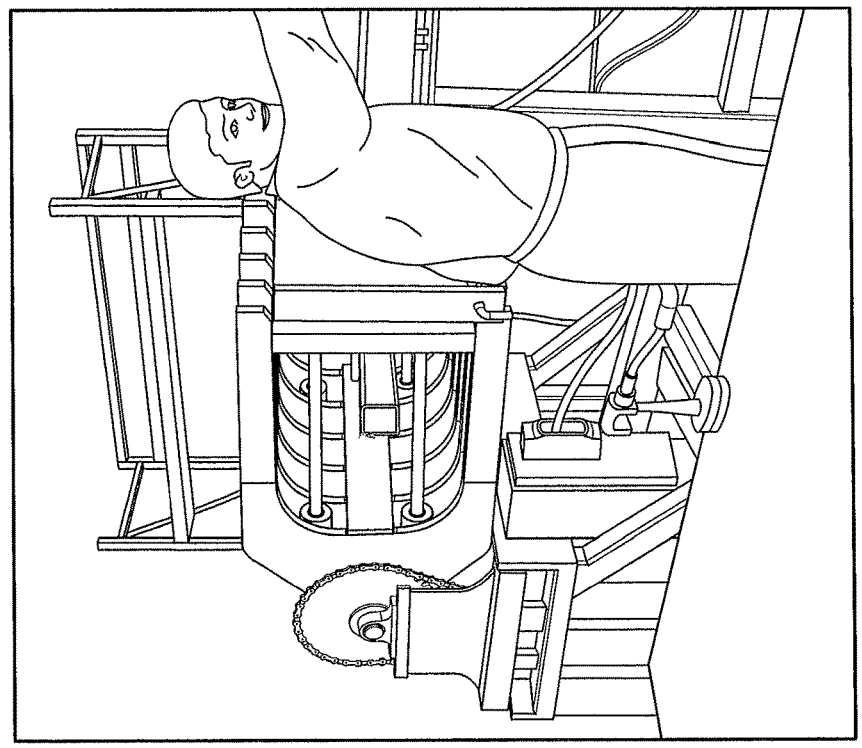
FIG. 7 illustrates the load carriage and base showing the transfer plate in an extended state.
Figure 10:
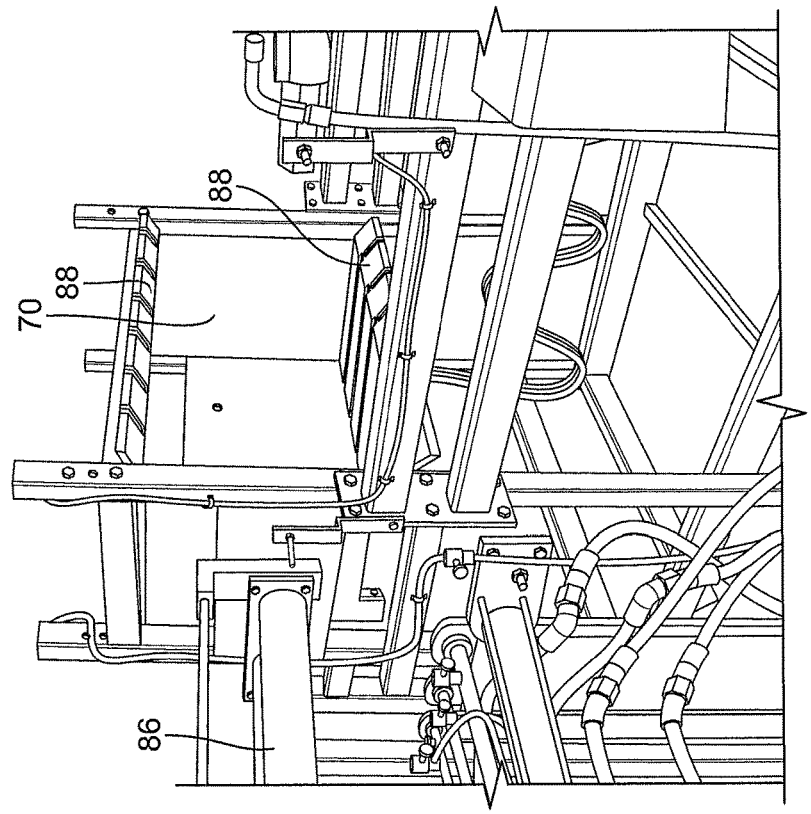
FIG. 10 is perspective illustration of the bagger entrance and showing, in partial view, the discharge drive.
Figure 9:
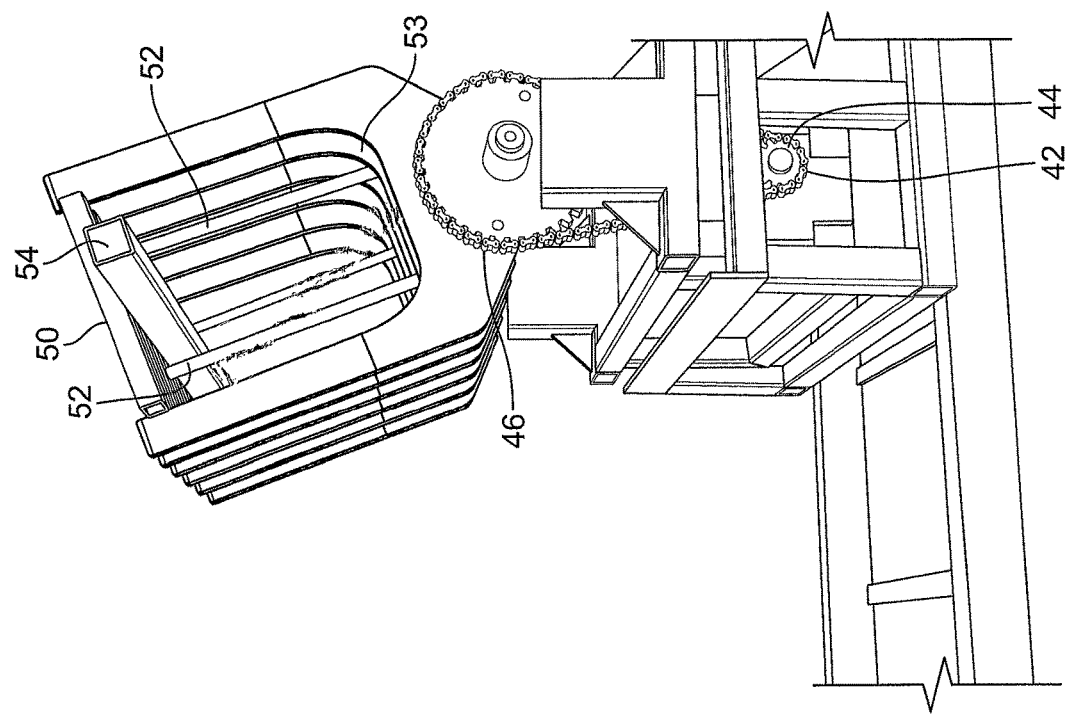
FIG. 9 is another illustration of the load carriage in a partially pivoted state.
Figure 12:
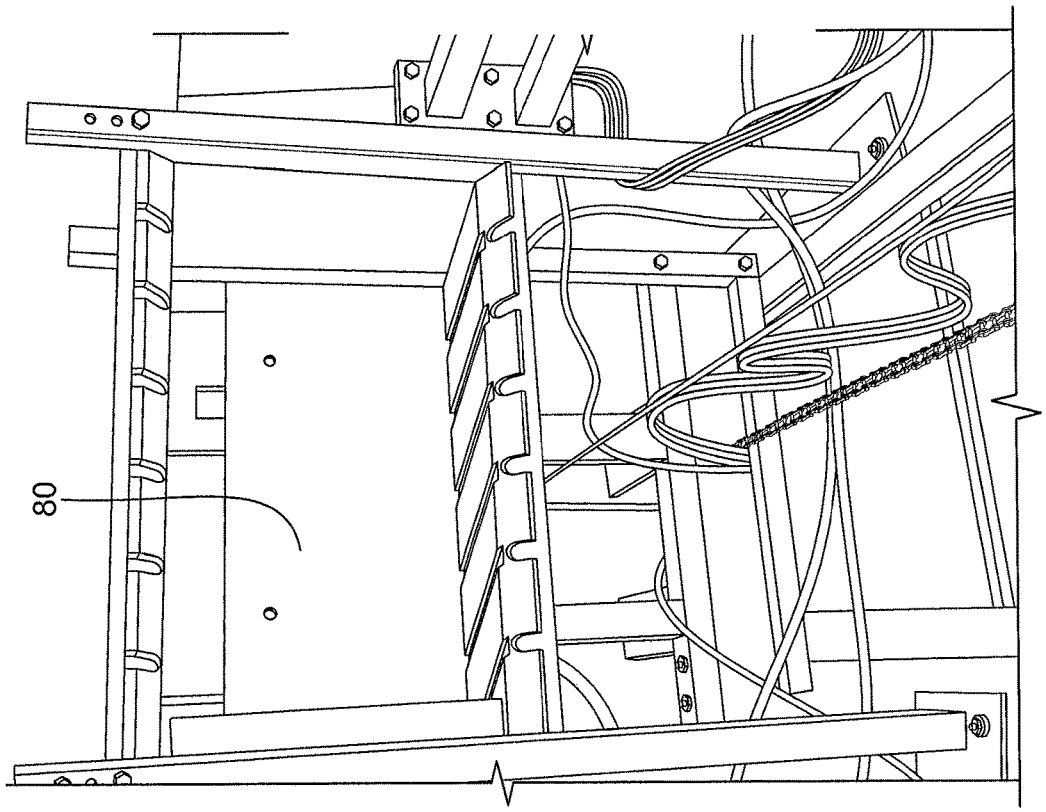
FIG. 12 is a view looking into the entrance of the bagger and showing the back-up plate.
Figure 11:
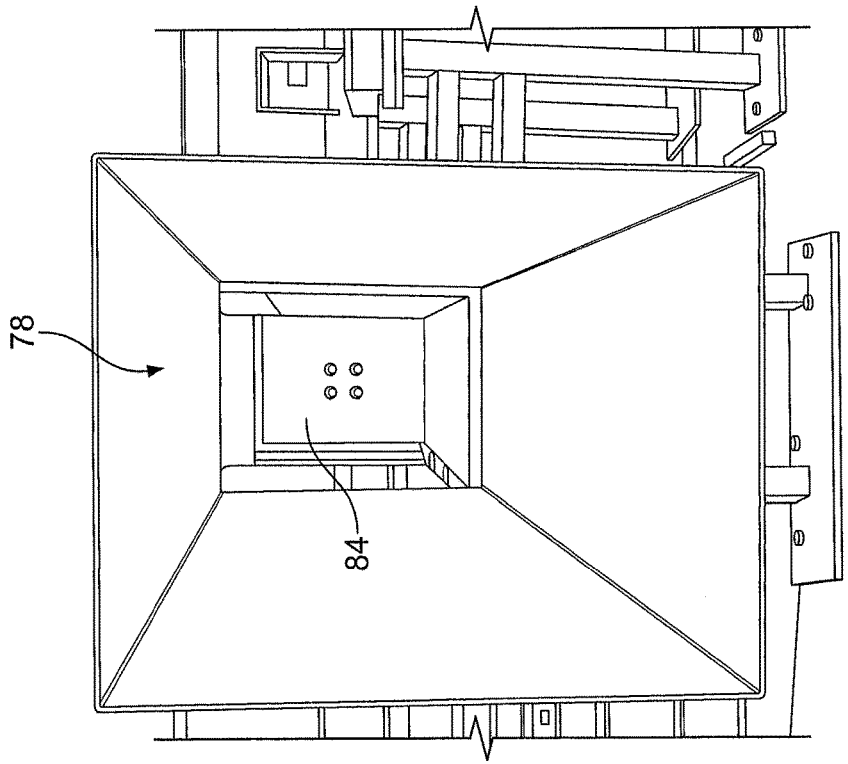
FIG. 11 is an illustration looking into the discharge end of the bagger and showing the discharge drive plate.

Referring now to FIGS. 1 and 2, one example embodiment of a system for containing a bale B of compressible material in a flexible bag 100 without straps of wires according to the present disclosure includes a press 12, a conveyor or cart 14, a bagging station or bagger 16 and a controller 18. The press 12 receives a quantity of compressible material and compresses the material to form a bale of compressed material. In an embodiment, the system 10 is configured to receive the compressed bale from the press 12 and cause the compressed bale B to be transferred and inserted into the bag 100. In an embodiment, during compression of the bale B, a plurality of grooves or channels G can be formed in one or more surfaces S of the bale B recessed from an outermost surface S of the bale B. The bag 100 is flexible and conforms to the shape of the compressed bale B, including the grooves or channels G, as described in further detail below.

The press 12 includes a receiver or bale box 20 and a pair of compression plates 22, 24. The bale box 20 has stationary side walls 25a,b and 27a,b that define a bale box perimeter around the compression plates 22, 24. In one embodiment, the side walls 25a,b and 27a,b of the bale box 20 define a rectangular perimeter.

In an embodiment, the compression plates 22, 24, are upper and lower compression plates. Material, such as cotton, is received in the bale box 20, and rests on, for example the lower compression plate 22. The upper compression plate 24 is positioned above the bale box 20. The bale box stationary side walls 25a,b and 27a,b contain the material as it is compressed between the upper and lower plates 22, 24.

One or both of the upper and lower compression plates 22, 24 can include a plurality of grooves or channels 26 therein. In an embodiment, the grooves or channels 26 in the upper and lower plates 24 are parallel to or coincident with one another such that they are aligned with each other. The grooves 26 can be spaced apart from each other, on one or both of the upper and lower plates 22, 24, an equal distance or at predetermined distances from one another that vary along the length of the plates 22, 24. In other words, the distances between grooves 26 along the upper and lower plates 22, 24 can be the same or they can vary. As discussed in more detail below, the grooves 26 are configured to receive the tines 28 of fork sets 38 that insert above and below the bale B.

In an embodiment, at least two of the bale box stationary side walls, for example walls 25a,b, have ribs 29 formed therein extending inwardly of the bale box 20. The ribs 29 extend along the at least two sides 25a,b in a direction parallel to the compression direction C. The ribs 29 can be formed as strips that are mounted to the walls 25a,b and extend the full length or height of the box 20. In the illustrated embodiment, the ribs 29 extend in a direction that is parallel to the compression direction C; that is, the ribs 29 extend between open ends of the bale box 20. As such, as the material is compressed between the compression plates 24, 26, it expands outwardly to the sides 25a,b and 27a,b of the bale box 20 and fills the spaces between the ribs 29.

It will be appreciated that as the material is compressed in the bale box 20 by the upper and lower plates 22, 24, grooves will be formed in the bale B by the upper and/or lower plate channels 26 and by the bale box sidewall ribs 29. The grooves formed by the compression plates or plate-formed grooves $G_p$, are formed in the direction of compression C; that is, the grooves $G_p$ are formed by pushing into the material. The grooves formed by the sidewalls, or sidewall-formed grooves $G_s$ are formed by the material moving outward against the stationary sidewalls 25a,b as the plates 22, 24 compress the material. The sidewall-formed grooves $G_s$ are thus formed transverse to the direction of compression C. As discussed in more detail below, because the bale B, once removed from the press 12 will expand more in the direction of compression C, the sidewall-formed grooves $G_s$ will remain more pronounced than the plate-formed grooves $G_p$.

As noted above, grooves G can be formed in the sides of the bale B by both the sidewalls 25a,b and the compression plates 22, 24. Regardless of where or how the grooves are formed, as the bale B expands against the bag 100, the regions of the bag 100 that overlie the recesses or grooves G conform to the shape of the recesses or grooves G which become recessed below the outermost face O of the bag 100. In this manner, any face or side of the bagged bale B that is facing or resting on the ground or floor has portions that do not make contact with the ground and so, even if the parts of the bag 100 that contact the ground are damaged, the recessed portions may remain intact.

In an embodiment, at least about 50 percent to 70 percent of the bale surface is present in the grooves $G_s$. It has been found that there is a significant increase in strength per inch of bale when at least about 50 percent to 70 percent of the bale surface is present in the grooves $G_s$. That is, by reducing the outermost surface O area that may be exposed to a surface, e.g., a floor, there is an increase in the strength of the bale as secured by the bag due to the presence of the bag 100 in the grooves G. In addition, because of the increased surface area of the bale B (the total of the outermost surface O area and the area within the grooves $G_s$), more of the bag 100 material is pulled into the grooves G to further increase the strength of the bag 100.

Figure 14:
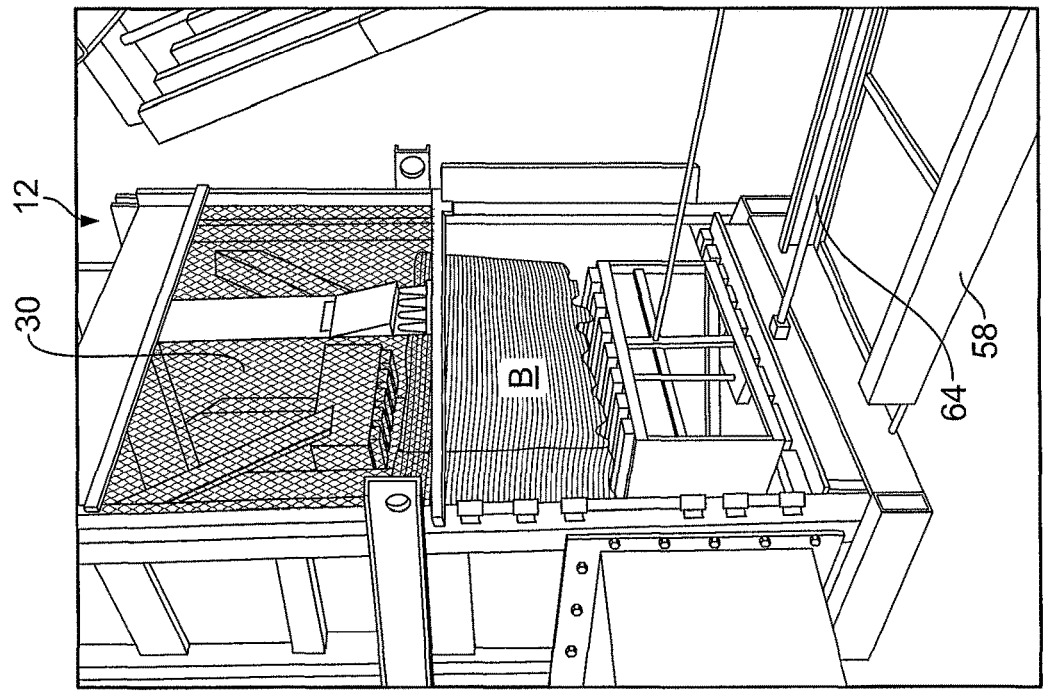
FIG. 14 is a perspective view of the bale press and a bale with the gate in an open position.
Figure 13:
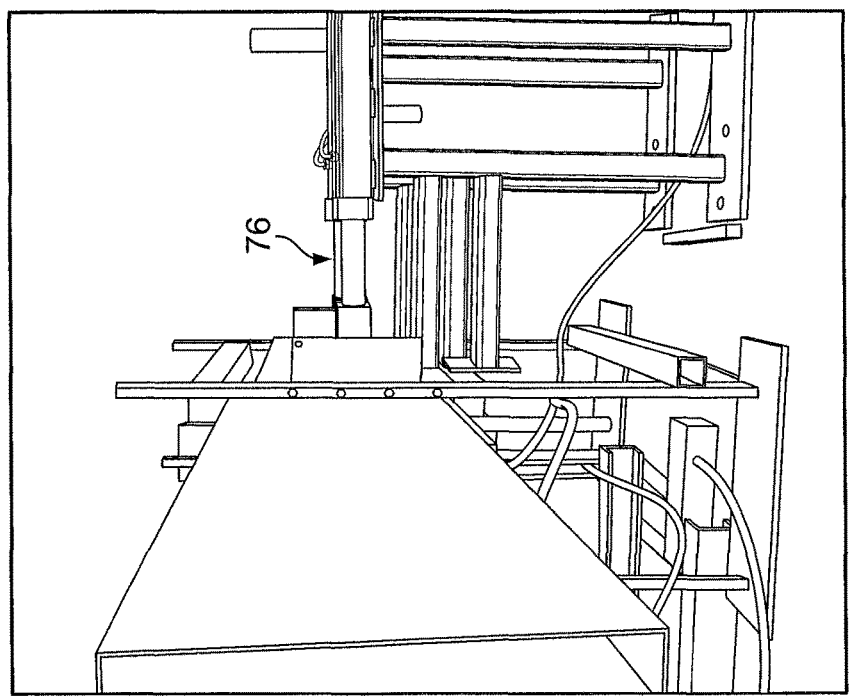
FIG. 13 is a side view of the bagger and the back-up cylinders.
Figure 15:
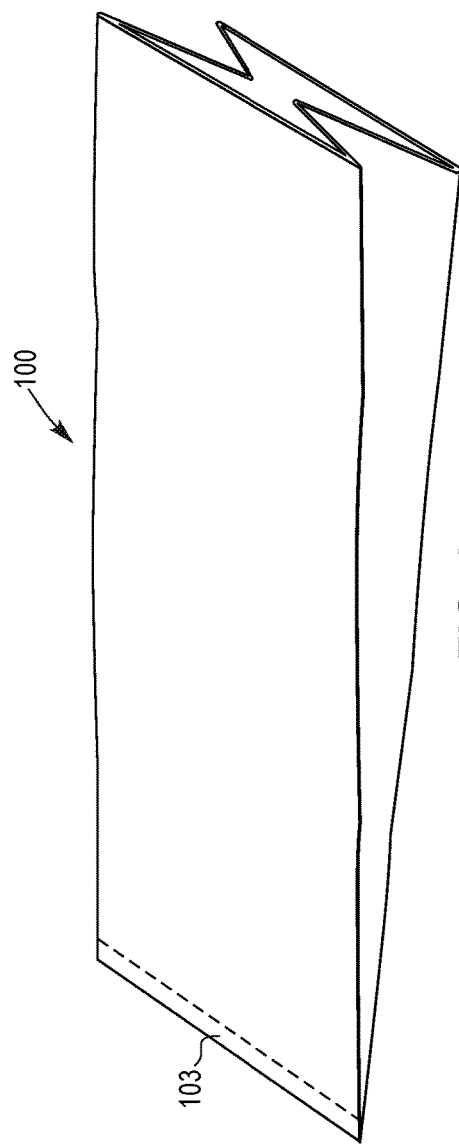
FIG. 15 is a perspective view of an example bag for containing a compressed bale of material in accordance with an embodiment of the system of the present disclosure, where the bag is shown in a folded state.
Figure 17:
FIG. 17 is a side view of the example bag in a folded state.
Figure 16:
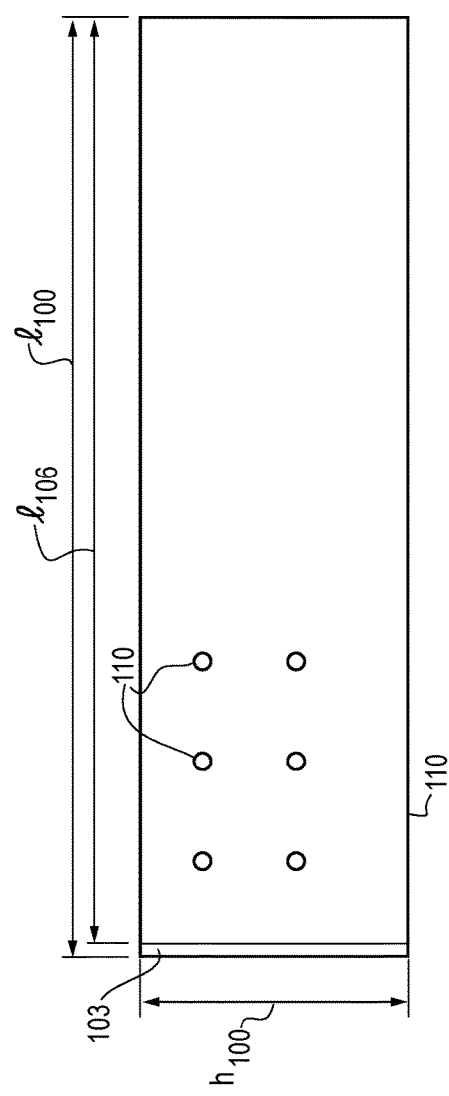
FIG. 16 is a front view of the example bag.
Figure 21:
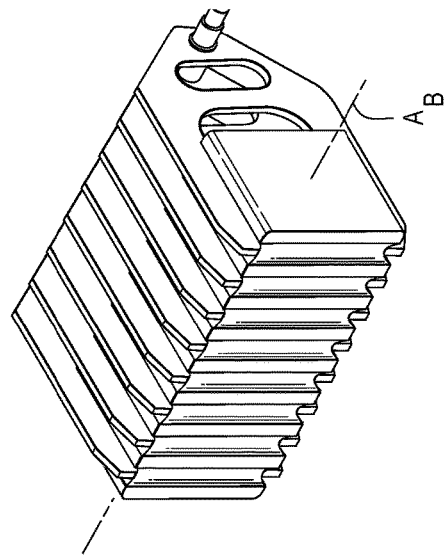
FIG. 21 is a perspective view of the compressed bale in the load carriage fork set.
Figure 20:
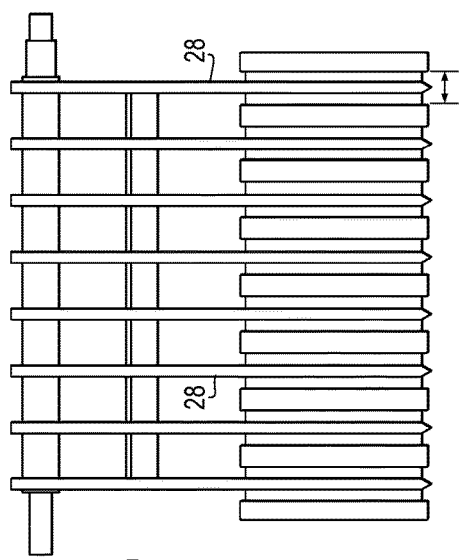
FIG. 20 is a top view of the bale in the load carriage as illustrated in FIG. 19.
Figure 19:
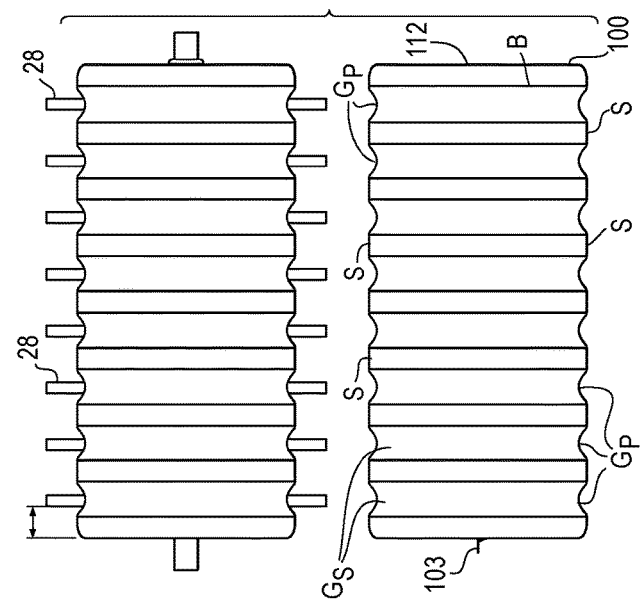
FIG. 19 is a front view of the example bag which shows the relationship of the compressed bale and the grooves or recesses formed in the bale from compression (and the load carriage fork set engaging the bale) and the bag as it conforms to the grooves in the bale.
Figure 23:
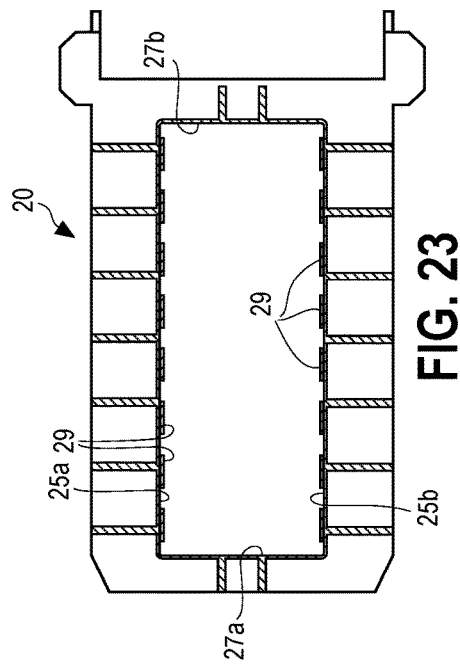
FIG. 23 is a top view of an example of a bale box showing internal ribs for forming grooves in the compressed bale.
Figure 24:
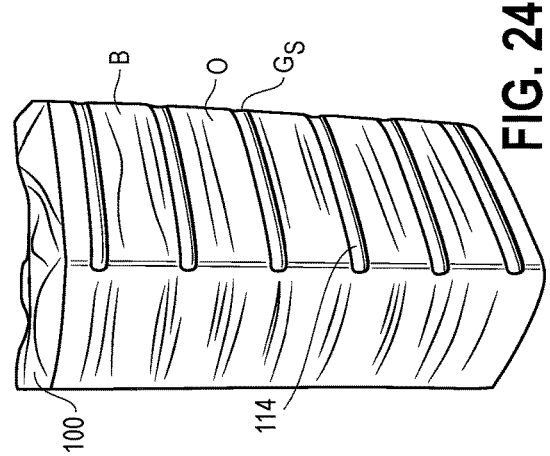
FIG. 24 is a perspective view of a bale compressed in the bale box of FIGS. 22 and 23.
Figure 22:
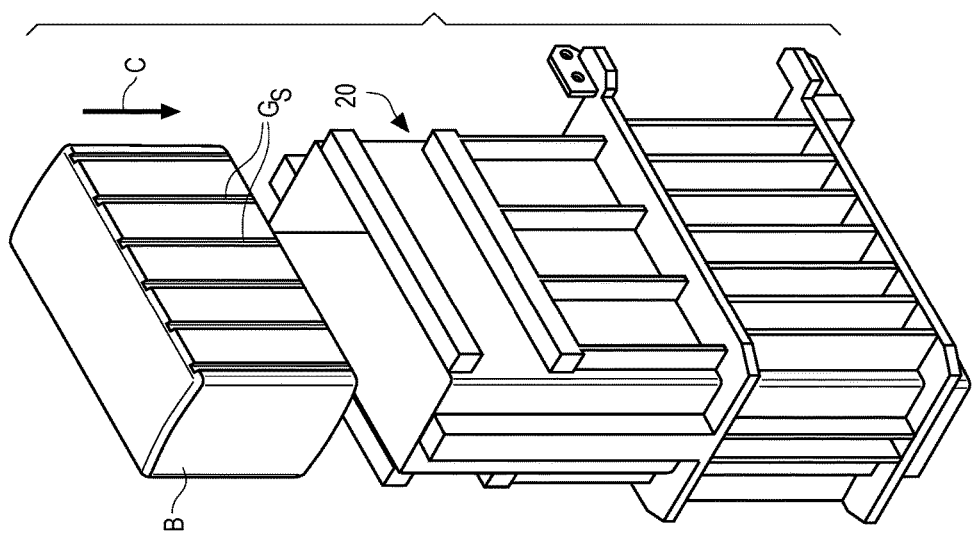
FIG. 22 is an exploded illustration of a compressed bale and an embodiment of a bale box.
Figure 28A:
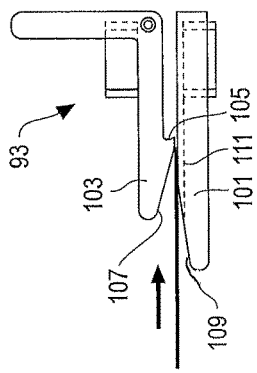
Figure 28B:
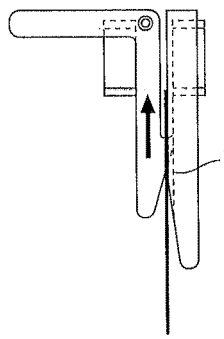
Figure 28C:
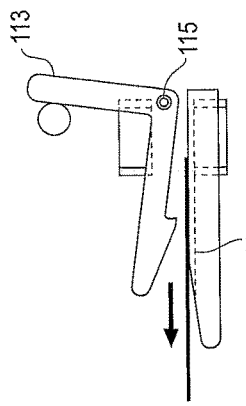

Referring to FIG. 14, the press 12 can include gates 30 or other personnel protection features to prevent personnel access to the press 12 when in operation.

As noted above, the system 10 includes a conveyor or cart 14, a bagger 16 and a control system or controller 18. For purposes of the present disclosure, the relative directions of side-to-side will refer to, for example, movement of the conveyor and/or cart 14 between the press 12 and bagger 16, and the directions of front-to-rear or rear-to-front will refer to, for example, movement of a bale B through the bagger 16.

In the illustrated example, the conveyor 14 is formed as a cart 32 having a load carriage 34 and a mobile base 36. The load carriage 34 includes multiple fork sets 38 mounted parallel to one another along a common shaft 40 that defines an axis $A_{40}$. The fork sets 38 pivot about 180 degrees about the axis $A_{40}$ as a single unit.

The fork sets 38 are spaced from one another a distance to cooperate with the guides 26 in the plates 22, 24. That is, the fork sets 38 insert into the guides 26 to, as will be described below, provide upper and lower supports as the bale B is removed from the press 12.

A drive assembly 42 is operably connected to the fork sets 38 to rotate the fork sets 38 about the axis $A_{40}$. The drive assembly 42 includes a drive 44, such as a motor, which can drive the fork sets 38 through a chain drive 44 mounted to the shaft 40, as illustrated, a gear drive or the like. The fork sets 38 are mounted to rotate or pivot about the $A_{40}$ axis about 180 degrees to reorient the bale B.

A pusher or transfer plate 50 is mounted to the fork sets 38 and is configured to push a bale B that is positioned in the fork sets 38 out of the fork sets 38. Shafts 52, mounted to plate 50, are mounted for sliding engagement with linear bearings 53, which are mounted to the fork sets 38 to provide smooth, linear movement of the plate 50 and to assure that the plate 50 remains transverse to the fork sets 38 as the bale B is transferred from the fork sets 38. A support bar 54 is also mounted to the plate 50.

The load carriage 34 is mounted to the cart 14 by a pivot shaft 55 and a plurality of springs 56 extend between the load carriage 34 and the cart 14. The pivot shaft 55 allows the load carriage 34 to pivot a short distance side-to-side relative to the cart 14 and the springs 56 maintain the load carriage 34 in a relatively fixed relationship to the cart 14, but allow the load carriage 34 to pivot slightly to adjust any shifting of the bale B within the press 12 and any shifting of the plates 22 and/or 24 that may occur.

It will be appreciated that because of the extreme force (up to one million pounds) that is exerted on the bale B, the plates 22, 24 may shift slightly. The pivot shaft 55 allows the load carriage 34 to pivot a short distance side-to-side and the springs 56 maintain the load carriage 34 in a relatively fixed relationship to the cart 14, but allow the load carriage 34 to pivot slightly to adjust for shifting of the bale B within the press 12.

The cart 14 is mounted to a track 58 along which it is conveyed between the press 12 and the bagger 16. The track 58 can be as long or as short as necessary to accommodate the footprint in which the system (conveyor/cart system 14 and bagger 16) and the press 12 are located. There are minimum space requirements, insofar as removing or withdrawing the bale B from the press 12 and rotating the load carriage 34 and bale B for introduction to the bagger 16.

A transfer station 66 is formed as part of the conveyor. In a present embodiment, the transfer station 66 includes a drive, such as the illustrated pair of cylinders 68 mounted upstream of the bagger 16 which cooperate with the transfer plate 50 and support bar 54 to ensure proper transfer of the bale B from the load carriage 34 to the bagger 16.

The bagger 16 includes an entrance 70, a discharge station 72, a bag or discharge mandrel 74 and may include a back-up assembly 76. The discharge station 72 includes a chute 78 into which the bale B is transferred from the load carriage 34. As such, the entrance 70 opens into a chute 78—the entrance 70 is that side facing the cart load carriage 34—to receive the bale B. The back-up assembly 76, if used, is positioned on a side opposite the entrance 70 and includes a movable wall 80 mounted to the chute 78 by a drive 82, for example, the illustrated plurality of cylinders. The wall 80 moves from the side of the chute 78 to the bale B as the bale B enters the entrance 70, to facilitate transfer of the bale B into the chute 78.

A discharge plate 84 is mounted at a rear of the discharge station 72, rearward of the entrance 70. The discharge plate 84 is driven forwardly into the chute 78 by a drive 86, for example, a cylinder. In a home position, the discharge plate 84 is rearward of the entrance 70 so as to not interfere with movement of the bale B into the chute 78. The cylinder or drive 86 for the discharge plate is a dual-acting drive so that the plate 84 can be returned to the home position following discharge of the bale B. The entrance 70 includes guides 88 that cooperate with the fork sets 38 when transferring a bale B from the load carriage 34 to the bagger 16.

The bag mandrel 74 is positioned at the front of the discharge station 72. A bag 100, having a sealed end 103, is positioned over the end of the mandrel 74. In this manner, as the bale B is pushed out of the chute 78, it engages the bag and pulls the bag onto and over the bale B.

A bag applicator assist device 89 is illustrated in FIGS. 26A-28C. In prior baling systems, a bag was manually positioned on the mandrel when a bale was in the discharge, ready for bagging. This required an operator to open the bag, properly orient it for pulling it onto the mandrel and pull the bag up onto the mandrel until the open end of the bag was at about the flange that secures the mandrel to bagger and so that the sealed or closed end 103 of the bag 100 is at about the open or discharge end of the mandrel 74. This is a labor intensive operation and, if an operator is not available, can delay the overall baling operation.

Figure 26A:
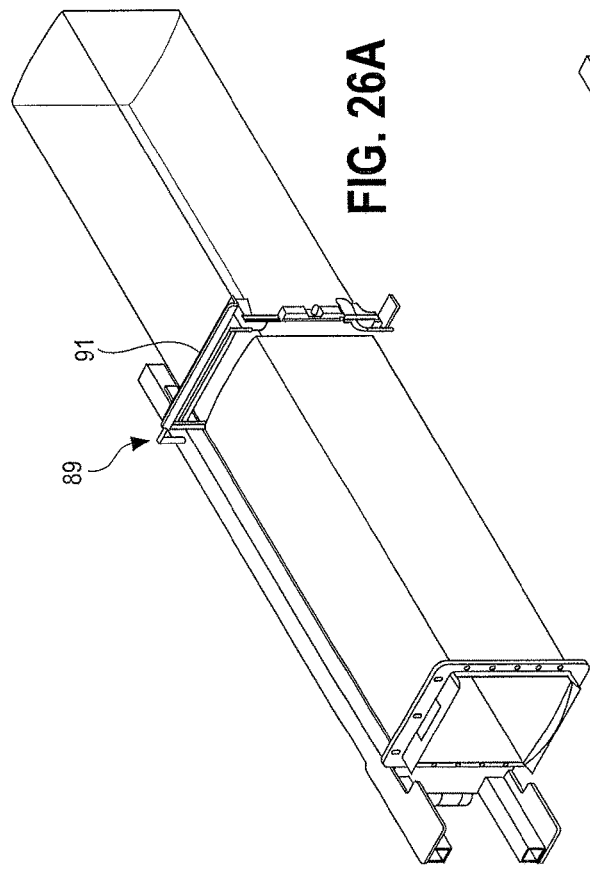
FIG. 26A is a perspective view of an embodiment of a bag applicator assist assembly shown with a bag secured in the assist device, ready for positioning on the mandrel.
Figure 26B:
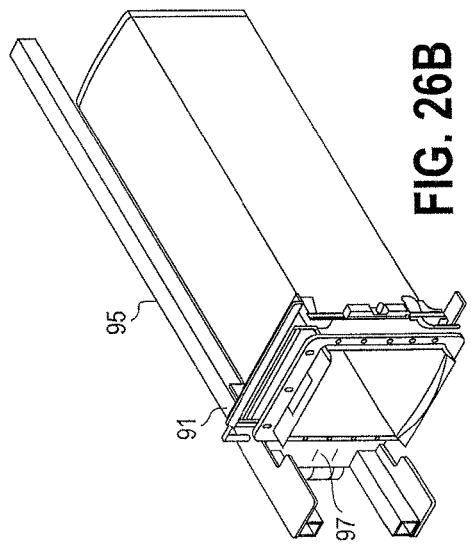
FIG. 26B is a perspective view with the bag positioned on the mandrel.

The bag applicator assist device 89 includes a frame 91 that extends around a periphery of the mandrel 74 and plurality of bag grippers 93 mounted to the frame 91. The frame 91 is movable along a rail 95 from a position at about the discharge end of the mandrel 74 (a loading position as illustrated in FIG. 26A) to the end of the mandrel 74 where the mandrel mounts to the bagger 16 (a bagging position as illustrated in FIG. 26B). In an embodiment, the frame 91 includes a roller carriage 97 mounted thereto that engages and moves along the rail 95 to move the frame 91 between the loading and bagging positions. The applicator assist device 89 can include a pair of rails 95 and a guide 99 to further guide the frame 91 along the mandrel 74.

The bag grippers 93 are positioned on the frame 91 and are configured to grip and secure a bag 100 as the bag is moved from the loading to the bagging position. In an embodiment, the grippers 93 include a stationary grip finger 101 and movable grip finger 103. The movable grip finger 103 is biased toward the stationary finger 101 and is configured to capture a portion of the bag 100 between the fingers 101 and 103. In an embodiment, the movable finger 103 includes a detent or hook portion 105. The hook 105 has a ramped face 107 that permits sliding the bag 100 between the fingers 101 and 103, but prevents dislodging the bag 100 from the fingers 101, 103 (prevents pull out of the bag from the fingers).

The stationary finger 101 can also include a ramped face 109 to permit sliding the bag 100 between the fingers 101 and 103, without opening a space between the fingers. The stationary finger 101 can further include a channel or opening 111 in which the hook 105 resides when the gripper 93 is closed. This provides a secure engagement of the bag 100 in the gripper 93 in that the portions of the movable finger 103 and stationary finger 101 overlap, with the bag 100 between the fingers 101, 103.

The grippers 93 can include a release member 113. In an embodiment, the release member 113 is operably connected to the movable finger 103. The release member 113 can be a lever operably connected to or formed as part of the movable finger 103. The finger 103 is mounted to the gripper 93 by a pivot 115, such that contact with the release member 113 pivots the movable finger 103 away from the stationary finger 101 to release the bag 100. The movable finger 103 can be biased into engagement with the stationary finger 101 to maintain the bag 100 secured in the gripper 93. The movable finger 103 can be manually opened by the pivoting release member 113 to release the bag 100 from the gripper 93.

As illustrated, fours grippers 93 can be positioned on the frame 91, located at about the corners 117 of the frame 91. These locations correspond to the corners of the bag 100, and maintain the bag 100 open, and secure the bag 100 at its corners for movement on to the mandrel 74. It will be appreciated that the number and position of the grippers 93 can vary depending upon a desired configuration.

In an embodiment, the frame 91 is manually movable along the rails 95 from the loading to the bagging position and the movable fingers 103 are manually pivoted to release the bag 100 from the grippers 93. It is contemplated that an automated or powered system can be incorporated into the bag applicator assist device 89 so that the frame 91 and bag 100 can be moved from the loading to the bagging position by a drive, such as a motor or the like, and so that the grippers 93 can be opened automatically upon movement of the bag 100 into position on the mandrel 74.

Referring again to FIG. 1, the controller 18 includes an operator interface station 94. The controller 18 controls the overall operation of the baler system 10. The controller 18 can also be integrated to include control of the press 12.

In a cycle, material is loaded into the press 12. When the compression or compaction cycle is complete, the press 12 is opened by, for example, lowering the lower compression plate 24, raising the bale box 20, or some similar movement or combination of movements to allow access to the compressed bale B. The cart 14 is moved toward and into the press 12. The fork sets 38, which are in a horizontal orientation, are inserted into the press upper and lower plate 22 and 24 guides 26 above and below the bale B, respectively. As noted above, in the event that the bale B shifts or that the guides 26 are slightly askew, the pivot shaft 55 and spring 56 mounting of the load carriage 34 to the cart 14 allow the load carriage 34 to pivot slightly side-to-side to align with the guides 26. Moving the cart 14 inward toward, and into engagement with the bale B urges the transfer plate 50 into the apex of the fork sets 38.

Once the cart 14 is properly positioned with the bale B captured within fork sets 38, the fork sets rotational drive 44 can be actuated to rotate the fork sets 38 and the bale B upward or downward at a slight angle to facilitate loosening the bale B from the press 12. Once the bale B is free of the press 12, the cart 14 backs away from the press 12 and begins to move toward the bagger 16. At this time, the fork sets 38 and bale B are pointed generally in the direction of the press 12. The fork sets 38 are then rotated (about 180 degrees). The fork sets 38 and bale B can be rotated as the cart 14 is moving toward the bagger 16. In the final orientation, the fork sets 38 and bale B are oriented to point toward the bagger 16 with the bale B at about the entrance 70 of the chute 78. In this position, the fork sets 38 are located between the transfer cylinders 68 and the entrance 70, and the support bar 54 is aligned (horizontally) with the transfer cylinders 68.

To accept the bale B, the back-up assembly 76, if used, is extended toward the entrance 70, and the discharge plate 84 is in a retracted or home position. The cart 14 is moved toward the bagger 16 so that the fork sets 38 align and cooperate with the entrance guides 88, and the cart is further moved forward to move the bale B into the entrance 70. When the bale is at the entrance 70, the back-up assembly wall 80 is in contact with the side of the bale B at the entrance. In this manner, the bale B is captured between the transfer plate 50 and the wall 80. The back-up assembly 76, which as noted above may be used, can be used if, for example, there is more fiber on one side of the bale B than on the other side of the bale B. Thus, when the bale B is captured between the transfer plate 50 and the back-up assembly 76, the back-up assembly 76 supports bale B transfer from the fork sets 38 and also prevents loosening of the bale (e.g., the bale B is retained in the compressed state).

The transfer cylinders 68 are then actuated which pushes the transfer plate 50, which in turn pushes the bale B in a transfer direction from the fork sets 38 into the entrance 70. It will be appreciated that the shafts 52 maintain the plate 50 flat against the side of the bale B, and do not allow the plate to skew, as the bale B is pushed into the entrance 70. Pushing the bale B into the entrance 70 also pushes the wall 80 back to a retracted position.

Once the bale B is in the chute 78, the discharge plate cylinder 86 is actuated to push the bale B from the entrance 70 along or through the chute 78 toward the bag mandrel 74 in a bagging or containerizing direction.

At a desired time during the baling operation, the bag 100 is positioned on the mandrel 74. The bag applicator assist frame 91 is in, or moved to, the loading position and a bag 100 is positioned on the frame 91, secured to the frame 91 by the grippers 93. The frame 91 is then moved from the loading position to the bagging position by sliding the frame 91 along the rails 95. When the bag 100 is in the bagging position, the grippers 93 are opened to release the bag 100 and the bag is ready to receive a bale B. Engagement of the grippers 93 with the bag 100 and the bag configuration are described in more detail below.

It is contemplated that a bale B will be present in the discharge end 90 of the chute 78 as a subsequent bale is introduced into the entrance 70. As the bale B in entrance 70 is urged toward the discharge end 90, the prior bale (in the discharge end 90) is forced out through the mandrel 74 and is captured in the bag 100 at the final discharge 92.

The bag 100 is flexible and conforms to the shape of the compressed bale B. In various embodiments, the bag 100 is made of a suitable high strength material or combination of materials such as polyethylene terephthalate (PET), polypropylene, polyethylene, or the like. It is anticipated that bags 100 can be manufactured from recycled materials, for example, recycled PET, which provides the necessary strength. In an embodiment, the bag 100 is formed by weaving or looming the polymeric strands or tapes to form the woven material. In an embodiment, a bag 100 may be formed from a material of woven strands or tapes of polyethylene terephthalate (PET). Those skilled in the art will recognize that such a woven material can be formed from any suitable material and, if woven from tapes, may be formed having any suitable tape density. In various embodiments, the bag 100 of the present disclosure may include one or more ventilation holes or openings 110 to permit ventilation for the compressed load to, for example, reduce condensation in the wrapped load and to permit air circulation around the load. An end of the bag may include a seal 103.

The bag 100 can be formed with receiving regions 119 configured to cooperate with the grippers 93. In an embodiment, the bag 100 can include through-wall openings 121 at about the corners 123 that receive the grippers 93 therein. The openings 121 can be reinforced, as indicated at 125, to assure that the grippers 93 remain in the receiving regions 119 and that the bag 100 is not torn or otherwise compromised by the grippers 93 as the bag is moved into the bagging position on the mandrel 74. Other configurations for the receiving regions 119 are contemplated, such as rings, loops or hooks formed on or mounted to the bag.

In use, the frame 91 is moved to the loading position and the bag 100 is positioned at about the end of the mandrel 74. The bag 100 is secured to the grippers 93 with the receiving regions 119 engaged by the grippers 93. The frame 91 is then moved along the rails 95 from the loading position to the bagging position. Once in the bagging position, the release members 113 are actuated to release the bag 100 from the grippers 93. After the bale B has been discharged from the mandrel 74 and loaded into the bag 100, the frame 91 can be returned to the loading position to position a subsequent bag on the bag applicator assist assembly.

When the bale B is introduced into the bag 100, the bale B will expand. It has been observed that the bale B will expand to a greater extent in the direction of compression C. Viewed another way, the plate-formed grooves $G_p$ will expand more than the sidewall-formed grooves $G_s$, because the plate-formed grooves $G_p$ are formed in the direction of compression C of the bale B. As such, the sidewall-formed grooves $G_s$ will remain more pronounced and will better retain their profile than the plate-formed grooves $G_p$. And, when the bale B is introduced into the bag 100, the bag 100 will conform to all of the grooves G, including the more pronounced sidewall-formed grooves G.

Advantageously, the portions of the bag 100 overlying any face or side of the bagged bale B that is facing or resting on the ground (or floor) has portions that do not make contact with the ground. Thus, even if the bag 100 on the surface of the bale B is abraded or torn, the regions of the bag within the grooves G will maintain the bale B in a compressed state and will maintain the integrity of the bale. For example, if the parts of the bag 100 that contact the ground are damaged (such as when the bale B is moved around the floor of a warehouse, or loaded and unloaded from a truck and the face of the bag 100 is abraded), the recessed portions of the bag 100 which conform to the channels or grooves G may remain intact to maintain the bale in a compressed and contained state.

In an embodiment a method for compressing, containing, and protecting a compressible material, includes receiving a quantity of the compressible material in a press 12. The material is compressed, forming a plurality of grooves G in one or more sides of the bale B. In an embodiment, the grooves G are formed in opposing sides of the bale B. The grooves can be plate-formed grooves $G_p$, for example, formed in the top and/or bottom faces of the bale B engaged by the upper and/or lower compression plates 22, 24, the grooves can be sidewall-formed grooves $G_s$ formed in the sides of the bale B engaged by the bale box sidewalls 25a,b, or the grooves G can be formed in a combination of the sides (including the top and bottom) of the bale B. In an embodiment, sidewall-formed grooves $G_s$ are formed in at least two sides of the bale B.

In an embodiment, the method includes compressing the bale of material at a first location (at the press 12) and transferring the compressed bale B, in a transfer direction to a second, different location (a bagging or containerizing location 16) for bagging. In some embodiments, while being transferred to the bagging location 16, the bale B is retained in the compressed state. The method further includes positioning a bag in one or more bag grippers mounted to a frame that is positioned at a loading position, moving the frame along the mandrel to a bagging position and releasing the bag from the grippers. The compressed bale is conveyed through the mandrel and into the bag. In a method, bagging or containerizing may be carried out in a different direction (a bagging or containerizing direction) different from (e.g., transverse to) the transfer direction.

It will be appreciated by those skilled in the art that the relative directional terms such as sides, upper, lower, rearward, forward and the like are for explanatory purposes only and are not intended to limit the scope of the disclosure.

All patents or patent applications referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A bag applicator assist device for a baling system having a discharge mandrel, the device configured to position a bag on the discharge mandrel, the device comprising:
    a frame movable longitudinally along the mandrel between a loading position and a bagging position; and
    a gripper mounted to the frame and movable between a closed position to secure a portion of the bag and an open position to release the bag, wherein the gripper includes a stationary finger and a movable finger, the movable finger being movable relative to the stationary finger between a closed position in which the gripper is in the closed position and an open position in which the gripper is in the open position, wherein the movable finger is biased toward the stationary finger and to the closed position.

2. The device of claim 1, which includes four grippers mounted to the frame, each gripper being positioned at about a different corner of the frame.

3. The device of claim 2 wherein the movable finger includes a component configured to cooperate with the stationary finger to secure the bag therebetween.

4. The device of claim 3 wherein the stationary finger defines an opening sized to receive the component.

5. The device of claim 2, further including a release member operably connected to the movable finger to move the movable forger from the closed position to the open position.

6. The device of claim 5 wherein the release member is a lever that is part of the movable finger.

7. The device of claim 1, further including a rail, wherein the frame is movably mounted to the rail such that the frame can move along the rail between the loading position and the bagging position.

8. A bag for containing a bale of compressible material, the bag comprising:
    a polymeric tubular member having:
        a sealed end;
        an open end defining four corners; and
        a gripper receiving region at about each corner, the gripper receiving regions being different from regions adjacent thereto and defining reinforced through-wall openings that extend through the polymeric tube member.

9. The bag of claim 8 wherein the polymeric tubular member defines a plurality of through-wall ventilation openings that extend through the polymeric tubular member.

10. The bag of claim 8, wherein the polymeric tubular member is formed from woven strands of polymeric material.

11. The bag of claim 10 wherein the polymeric material is polyethylene terephthalate.

12. The device of claim 3, wherein the component includes one of a hook and a detent.

13. The device of claim 4, wherein the opening comprises a channel.

14. The bag of claim 8, wherein the through-wall openings are circular holes.

* * * * *

UNITED STATES PATENT AND TRADEMARK OFFICE
CERTIFICATE OF CORRECTION

PATENT NO. : 10,206,333 B2
APPLICATION NO. : 15/088300
DATED : February 19, 2019
INVENTOR(S) : Joseph E. Lininger et al.

Page 1 of 1

It is certified that error appears in the above-identified patent and that said Letters Patent is hereby corrected as shown below:

In the Claims

Column 12, Claim 5, Line 15, delete "forger" and insert -- finger --, therefor.

Signed and Sealed this
Ninth Day of July, 2019

Andrei Iancu
*Director of the United States Patent and Trademark Office*